May 19, 1953        G. A. GOTTLIEB        2,638,995
VEHICLE PARKING DEVICE
Filed April 30, 1948        2 Sheets-Sheet 1
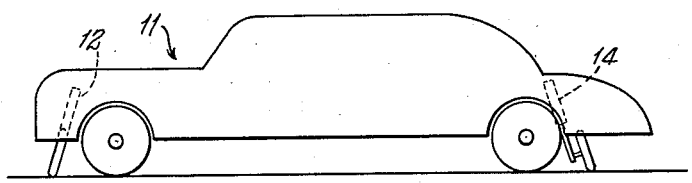
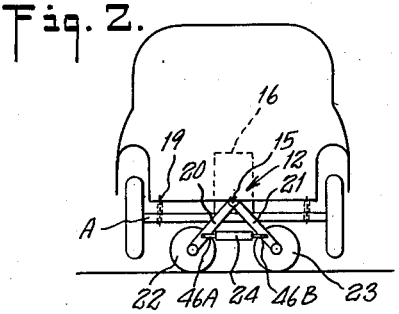 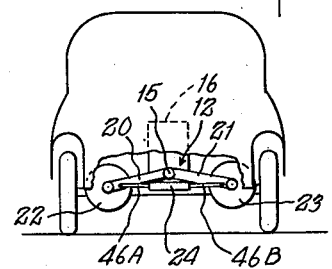
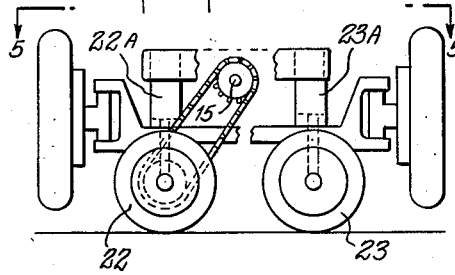 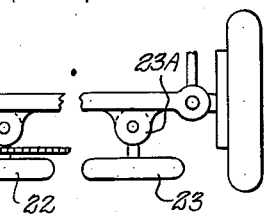
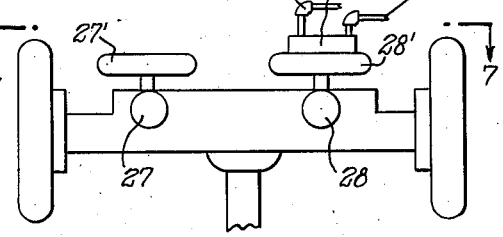
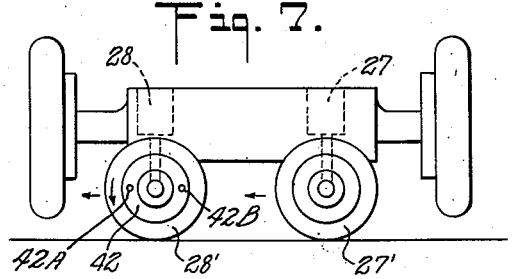
INVENTOR.
GEORGE A. GOTTLIEB
BY
Howard T. Jeandron
ATTORNEY May 19, 1953     G. A. GOTTLIEB     2,638,995
VEHICLE PARKING DEVICE
Filed April 30, 1948     2 Sheets-Sheet 2
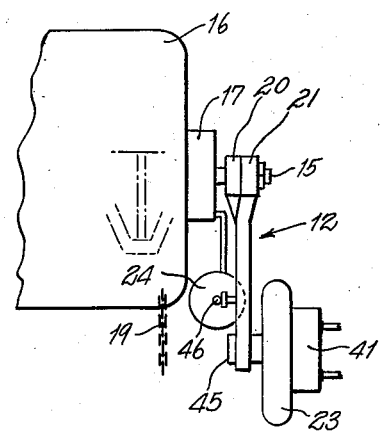
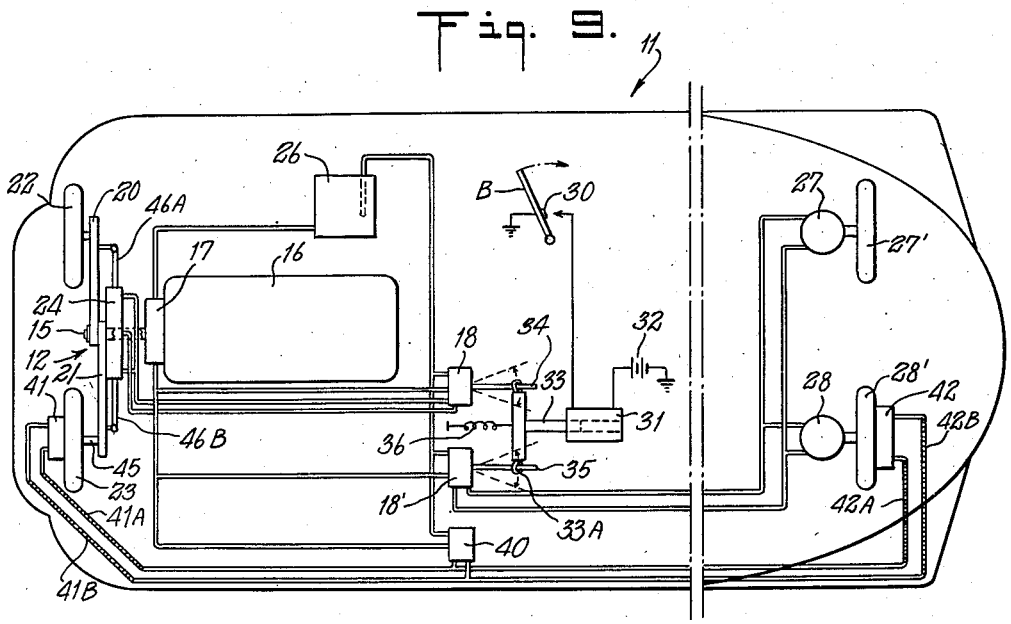
INVENTOR.
GEORGE A. GOTTLIEB
BY
Howard J. Jeandron
ATTORNEY Patented May 19, 1953

2,638,995

UNITED STATES PATENT OFFICE 2,638,995

VEHICLE PARKING DEVICE

George A. Gottlieb, New York, N. Y.

Application April 30, 1948, Serial No. 24,216

2 Claims. (Cl. 180—1)

This invention relates to improvements in automobile parking devices, especially those of the type adapted to raise a vehicle from its ordinary driving wheels and move it substantially at right angles to its usual direction of travel.

The prior art illustrates a number of parking devices that are operated mechanically, hydraulically, or by pneumatic means. The disadvantages found with all of the prior devices are the complex nature of the device, the expensive manner of construction, the fact that most of these devices must be built into the automobile, and the fact that most of these devices do not conform to the necessary design and clearances permissible in the present day cars.

Applicant has designed a hydraulically operated system and mechanism for jacking a car, either the front end alone, or the rear end alone, or the complete car, for purposes of parking, and the same hydraulic system is utilized to propel the parking mechanism to move the car into a parking position.

An object of applicant's invention is to provide an improved parking device which contemplates a hydraulic power means connected to the motor of the car to supply hydraulic fluid under pressure as the means of raising the car with hydraulic jacks and thus transferring the car load to a plurality of auxiliary wheels that are directed at right angles to the usual car wheel alignment.

A further object of this invention is to provide a hydraulically operated system connected to the power plant of the automobile in which the hydraulic jacks have auxiliary wheels mounted at the end thereof and hydraulic motors are mounted in the auxiliary wheels and the hydraulic system is in turn connected to these hydraulic motors to produce the power means of driving the auxiliary wheels to park the car.

A still further object of this invention is to provide a hydraulic system connected to the motor of the car in which a selector valve is provided to permit operating the jacking means for the front or rear of the car independently, and in which a safety shut-off is included in the selector valve so that neither jack may be operated as long as the car is free to roll. Said valve may be opened upon the application of the emergency brake of the car to thus permit operation of either or both jacking means.

A still further object of this invention is to provide hydraulic jacking means for an automobile in which auxiliary wheels are attached to the ground end of said jacks and in which hydraulic motors are incorporated in the auxiliary wheels and a hydraulic system is connected to said motors to permit supplying a motivating force to the motors to drive them in either direction to thus permit parking a car by means of the auxiliary wheels, thus moving the car at right angles to its normal direction of travel.

A further object of this invention is to provide a hydraulic pump incorporated in the motor of the automobile and a hydraulic cylinder operated from said pump and a pivotally operated double wheel supported jacking means that is supported on the crank shaft of the motor and in which said hydraulic cylinder provides means to retract said auxiliary wheels out of engagement with the ground or, by contracting, causes said auxiliary wheels to engage with the ground and provide a jacking or raising of the motor from the ground.

Further objects of this invention shall be apparent by reference to the accompanying detailed description and drawings in which Fig. 1 illustrates a side elevational view of an automobile in which the parking mechanism is incorporated, Fig. 2 illustrates a front elevational view of the automobile with the front parking jack supporting the front end of the automobile, Fig. 3 illustrates a front elevational view in which the parking mechanism is retracted, Fig. 4 illustrates a front elevational view of the front axle illustrating another embodiment of the manner of mounting the jacking mechanism, Fig. 5 illustrates a plan view taken on line 5—5 of Fig. 4, Fig. 6 illustrates a plan view of the rear end of the automobile showing the manner of mounting the rear parking jacks and auxiliary wheels, Fig. 7 illustrates a rear elevational view taken on line 7—7 of Fig. 6, Fig. 8 illustrates a partial side elevational view of the automobile engine showing the fluid pump and front parking jack with auxiliary wheels, and, Fig. 9 illustrates a plan view of an automobile in which the hydraulic system for the parking jacks has been indicated schematically.

Referring to Fig. 1 there is illustrated a side elevational view of an automobile 11 in which jacking mechanisms 12 and 14 have been installed in the front end and in the rear end.

Referring to Figs. 2 and 3, the front and jacking mechanism 12 is illustrated as having been pivotally affixed to the crank shaft 15 of the motor mechanism 16. The mechanism 12 comprises a pair of pivotally supported arms 20—21 and a pair of wheels 22—23 which are rotatively mounted on the opposite ends of the members 20 and 21, respectively. A fluid jack or cylinder 24 is mounted between the arms 20 and 21 and by means of links at either end of the cylinder 24, it is affixed between these arms so that when the pistons (not shown) within cylinder 24 are retracted the mechanism 12 will assume the position illustrated in Fig. 2 and when the pistons (not shown) are moved outwardly in the cylinder 24 the mechanism will be extended and will assume the position illustrated in Fig. 3. Fig. 2 illustrates the jacking mechanism in its extended position supporting the front end of the automobile, and Fig. 3 illustrates the jacking mechanism 12 in its retracted position when not in use. It is to be noted that with the mechanism 12 mounted to the crank shaft 15 of the motor that in elevating the crank shaft when the fluid jack 24 assumes the position illustrated in Fig. 2, the front end of the car will be lifted, but due to the weight of the wheels of the car and due to their manner of suspension, the wheels would tend to remain upon the ground and would not be elevated according to the intent of this mechanism. Therefore, applicant utilizes a pair of chains 19 (Fig. 2) that are affixed to the crank case of the motor or the framework of the car in which the motor is affixed. These chains 19 are looped around the front axle A (Fig. 2) or wheel supporting link in the case of a knee action mounting and have sufficient clearance for the normal movement of the wheel when supporting the front end of the car but when the front end of the car is being elevated, the chains restrict the amount of movement of the front supporting springs so that the axle will rest in these chains and in turn, the wheels will be lifted with the elevating of the crank shaft 15. Thus it is apparent that the mechanism 12 will not only elevate the front end of the car but in addition will lift both front wheels from the ground and permit the use of parking wheels 22 and 23.

Although I have illustrated mechanism 12 pivotally affixed to the crank shaft of the automobile engine as the means of jacking the car, another embodiment of this invention includes the mechanism illustrated in Figs. 4 and 5 in which a pair of hydraulic cylinders 22A and 23A are mounted in the front frame of the automobile and these hydraulic cylinders support a pair of wheels 22—23 similar to those illustrated in Figs. 2 and 3. It is apparent in operation that the cylinders 22A and 23A may be attached to the hydraulic system of the automobile to be operated independently or in unison similar to cylinder 24 of Fig. 2. The normal retraction of wheels 22 and 23 retains them a sufficient height to permit the proper road clearance and when used for jacking the car or parking, the cylinders 22A and 23A will extend sufficiently to raise the front end of the car similar to the position illustrated in Fig. 4.

Referring to Fig. 6 there is illustrated the rear end assembly of an automobile in which a pair of fluid jacks 27—28 are affixed to the rear end housing assembly. The jack 27 supports an auxiliary wheel $27^1$ and the jack 28 supports an auxiliary wheel $28^1$. The jacks 27—28 are normally operated in unison. Therefore, wheels $27^1$ and $28^1$ will engage the ground and act to lift the whole rear end assembly during the actuation of jacks 27—28.

In Fig. 7, the rear elevational view of the unit illustrated in Fig. 6 is shown to illustrate the means of operating cylinders 27 and 28 to jack the rear end from the ground or to retract the auxiliary wheels $27^1$—$28^1$ from the ground after they have been used.

Referring to Fig. 8 there is illustrated an automotive engine 16. A portion of the engine 16 is shown in a side elevational view with the pump 17 mounted externally of the motor and driven by the crank shaft 15. The jacking mechanism 12 is also illustrated with the arms 20—21 pivotally mounted on the end of the crank shaft 15 externally of the engine housing.

The arm 20 is illustrated with a short jack shaft 45 mounted in the end thereof supporting the wheel 22 and, of course, arm 21 will similarly support the wheel 23. The hydraulic cylinder 24 is illustrated having the piston rod 46 attached by means of a bolt 46A to the arm 20 while the opposite end of the cylinder 24 has the other piston rod attached by means of a bolt 46B to the opposite arm 21. With this type of mounting as illustrated in Fig. 8, the jacking mechanism 12 may be incorporated with the automotive engine and may be installed in the automobile as a unit.

Referring to Fig. 9, a plan view of the automobile 11 is illustrated in which the mechanism 12 is shown in its proper relation to the motor 16. A fluid pump 17 is also illustrated as mounted to and driven by the motor 16. The fluid pump 17 is connected to a control valve 18 that is normally mounted on the dash of the automobile. The pump 17 is also connected to a fluid reservoir 26 and valve 18 is connected by a return line to the reservoir 26. Normally pump 17 will draw fluid from the reservoir 26 and deliver fluid under pressure to valve 18 through the valve, through a return line back to the reservoir 26. Since the jacking mechanism 12 must be operated independently, it is necessary to provide the valve 18 for operating the fluid cylinder 24 of mechanism 12 and in order that the rear jacking mechanism 14 may be similarly operated, a valve $18^1$ is also included. The valve $18^1$ is connected to pump 17 and reservoir 26 in parallel relationship with valve 18. Valve 18 will be connected to both ends and the center of the cylinder 24 by fluid pressure lines and valve $18^1$ will be connected to both ends of a pair of hydraulic cylinders 27 and 28 so that valve $18^1$ in one position will permit the actuation of the cylinders 27—28 in one direction, whereas when the valve $18^1$ is in its opposite position the cylinders 27—28 will be moved in an opposite direction. Valves 18 and $18^1$ are the type of selector valve having a neutral position in which the fluid lines to the cylinders are not connected to the pump pressure line or the return line. The neutral position of valves 18—$18^1$ is in reality a locked position in this installation, that is, when the emergency brake B of the automobile has been applied, an electrical contact 30 is completed. This contact in turn on the one side is connected to a ground. On the other side it is connected to a solenoid 31, the solenoid in turn being connected to a battery 32 and the battery in turn connected to a ground. When solenoid 31 is energized the solenoid rod 33 (which is T shaped) will be withdrawn so that the levers 34 and 35 of the valves 18 and $18^1$ respectively may be operated to actuate the cylinders connected thereto and, vice versa, when the emergency brake of the automobile is released, the contact 30 is naturally broken and the solenoid rod 33 (and particularly the T bar end) will be returned to its original locking position by means of a spring 36; each end of the T bar 33 is provided with a loop 33A to fit over levers 34 and 35 and in this position the valve rods 34 and 35 will be locked in their neutral position. It is apparent with the hydraulic system already described that an operator having applied the emergency brake of the automobile may operate the hydraulic jacking mechanism for the front end of the car or the rear end of the car or for both ends of the car by means of the valves 18 and 18$^1$ as long as the automobile engine continues to operate, and having operated the jacking mechanism the valves 18 and 18$^1$ may be returned to their neutral position and the jacking mechanism left in place holding the car supported. In a further embodiment of this invention the pump 17 is also connected to a valve 40; and a fluid motor 41 is rotatively mounted to either wheel 22 or 23 of the mechanism 12, while a fluid motor 42 is similarly rotatively mounted to either wheel 27$^1$ or 28$^1$ of the rear end jacking mechanism. During the operation of the motor 16 with pump 17 operating, after the jacking mechanism has been utilized to lift the automobile from the ground and with the automobile supported on the auxiliary wheels 22—23—27$^1$—28$^1$, it is necessary to move the automobile to the left or to the right. By using the same hydraulic fluid pressure developed by pump 17 and by operating valve 40 to either of its two positions, the fluid can be circulated to either side of the two fluid motors 41 and 42 thus driving both motors at the same speed to move the front and rear simultaneously. When the valve 40 is positioned in one position the fluid will cause both of the fluid motors 41 and 42 to be rotated at the same speed in a clockwise fashion. When valve 40 is moved to its opposite position the fluid will be circulated to both of the motors 41 and 42 to rotate them at the same speed in a counter-clockwise direction. Thus by means of the direction of rotation of motors 41—42 that are attached to the jack wheels, the car (that is the front and rear) can be moved to the right or to the left according to the positioning of valve 40. It is apparent that although I have indicated a piped connection to the fluid motors 41—42, it is necessary to include flexible tubes 41A and B to connect motor 41 and 42A and B to connect motor 42 in the wheel connection, due to the up and down movement of the jack wheels.

In the embodiment illustrated in Fig. 9 in which I provide a hydraulic drive through motors 41 and 42 to both the front and rear end of the car, the prime mover is the fluid pressure supplied to both motors. Since the fluid pressure supplied to each motor is the same, both motors should be driven at an equal speed thus moving the front and rear of the car as desired and in this instance it has been found that if either the front or rear of the car is moved slightly in advance, as soon as the end moving in advance has reached the curb, it will be stopped by the curb and the other end of the car will continue to move until it has reached a parallel or abutting position.

Although I have illustrated means of lifting an automobile from its normal supporting wheels and a hydraulic means of propelling the automobile to the right or left while supported on a plurality of auxiliary wheels, this invention shall not be limited by the mechanism illustrated and described but may be varied in any manner to accomplish the same result, and this invention shall be limited only by the appended claims.

What is claimed is:

1. The combination of fluid jacking means and fluid driving means in a fluid system to raise and move a vehicle having wheels into a parked position which includes an engine, a plurality of hydraulic jacks mounted on the front and rear ends of said vehicle for raising both the front end and rear end of said vehicle from said wheels, a fluid pump on said vehicle, means operatively connecting said pump and said engine for driving said pump from said engine, a fluid reservoir on said vehicle, a pair of selector valves on said vehicle, means connecting said reservoir with said pump, means connecting said reservoir with each of said valves, means connecting said pump with each of said valves, means connecting one of said valves with the hydraulic jacking means at the front end of the vehicle, means connecting the other of said valves with the hydraulic jacking means at the rear end of the vehicle, auxiliary wheels mounted at the ground end of each hydraulic jack and positioned to rotate at 90° to the plane in which the vehicle wheels rotate, a pair of fluid motors, one of said motors mounted to a front auxiliary wheel and the other of said motors mounted to a rear auxiliary wheel, a third selector valve, means connecting said pump and said third valve, means connecting said third valve with each of said motors, whereby fluid from said pump is transmitted through said third valve and said last mentioned means to thereby drive said motors and said auxiliary wheels, and whereby fluid from said pump is transmitted through said first and second valves and through said means connecting each of said first and second valves with their respective jacking means to thereby extend or retract said jacking means, and means to retract said jack wheels to an unobstructed position.

2. In a fluid pressure system for a motor vehicle having wheels, a brake actuating mechanism, and an engine, fluid pump on said vehicle, means connecting said pump to said engine to thereby drive said pump, a plurality of fluid jacking mechanisms mounted on the front and rear of said motor vehicle, a pair of selector valves on said vehicle, a reservoir on said vehicle, a solenoid operated locking means for said selector valves, means connecting said pump through one of said selector valves to the fluid jacking mechanism located at the front of the vehicle, means connecting said pump through the other of said selector valves to the fluid jacking mechanism located at the rear of the vehicle, means connecting said jacking mechanisms to said reservoir, said solenoid operated locking means mounted on said vehicle in the vicinity of said selector valves to normally lock same, a locking arm secured to and actuated by said solenoid and positionable between and in the path of movement of the means for operating each of said selector valves, circuit means for energizing said solenoid, means on said brake actuating mechanism for opening and closing said circuit means whereby when said brake actuating mechanism is released, said circuit means is interrupted to thereby de-energize said solenoid, a spring connected to said locking arm to normally retain said arm positioned between and in the path of movement of said selector valve operating means when said valves are in a neutral position and said solenoid is de-energized, means to energize said circuit means when said brake actuating mechanism is applied, means to operate one of said selector valves to thereby selectively energize or de-energize said jacking means on the front end of said vehicle, and means to operate the other of said selector valves to thereby energize or de-energize the jacking mechanism on the rear end of said vehicle.

GEORGE A. GOTTLIEB.

References Cited in the file of this patent

UNITED STATES PATENTS

| Number | Name | Date |
|---|---|---|
| 1,639,054 | Palmer | Aug. 16, 1927 |
| 1,642,960 | Krantz | Sept. 20, 1927 |
| 1,661,641 | Vecchi | Mar. 6, 1928 |
| 1,742,636 | Collins | Jan. 7, 1930 |
| 1,772,938 | Hatfield et al. | Aug. 12, 1930 |
| 1,928,305 | Blakesley | Sept. 26, 1933 |
| 1,937,457 | Wuebben et al. | Nov. 28, 1933 |
| 2,090,768 | Thomas | Aug. 24, 1937 |
| 2,106,289 | Wallace | Jan. 25, 1938 |
| 2,200,027 | Kirby | May 7, 1940 |
| 2,212,591 | De Manghi | Aug. 27, 1940 |
| 2,228,411 | Sheridan | Jan. 14, 1941 |
| 2,304,622 | Barrett | Dec. 8, 1942 |